(12) United States Patent
Maeda

(10) Patent No.: US 7,237,235 B2
(45) Date of Patent: Jun. 26, 2007

(54) APPLICATION DISTRIBUTION SYSTEM, AND DISTRIBUTION SERVER AND DISTRIBUTION METHOD THEREOF

(75) Inventor: Naoto Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 755 days.

(21) Appl. No.: 10/217,541

(22) Filed: Aug. 14, 2002

(65) Prior Publication Data
US 2003/0037107 A1 Feb. 20, 2003

(30) Foreign Application Priority Data
Aug. 16, 2001 (JP) ............................. 2001-247208

(51) Int. Cl.
*G06F 9/45* (2006.01)
*G06F 9/445* (2006.01)
*G06F 15/16* (2006.01)

(52) U.S. Cl. ...................... 717/152; 717/178; 709/203; 709/247

(58) Field of Classification Search ........ 709/201–203, 709/217–219, 246–247; 717/151–161, 171–173, 717/176–178
See application file for complete search history.

(56) References Cited

U.S. PATENT DOCUMENTS

| | | | | |
|---|---|---|---|---|
| 6,158,010 | A * | 12/2000 | Moriconi et al. | 726/1 |
| 6,212,564 | B1 * | 4/2001 | Harter et al. | 709/228 |
| 6,230,312 | B1 * | 5/2001 | Hunt | 717/108 |
| 6,263,491 | B1 * | 7/2001 | Hunt | 717/130 |
| 6,324,578 | B1 * | 11/2001 | Cox et al. | 709/223 |
| 6,393,569 | B1 * | 5/2002 | Orenshteyn | 726/4 |
| 6,463,581 | B1 * | 10/2002 | Bacon et al. | 717/154 |
| 6,711,619 | B1 * | 3/2004 | Chandramohan et al. | 709/229 |
| 2002/0069263 | A1 * | 6/2002 | Sears et al. | 709/218 |
| 2002/0087593 | A1 * | 7/2002 | Rank | 707/503 |
| 2002/0166117 | A1 * | 11/2002 | Abrams et al. | 717/177 |

FOREIGN PATENT DOCUMENTS

JP        2001092671 A  *  4/2001

OTHER PUBLICATIONS

"Java™ Networking Launching Protocol & API Specification (JSR-56)," published in Dec. 2000 by Sun Microsystems, pp. 1-44.
"RFC2616, Hpertext Transfer Protocol—HTTP/1.1, Jun. 1999," pp. 1,7,8,9,10.
"Java™ Servlet Specification, v2.2, Sun Microsystems, Dec. 1999," pp. 11-13.

* cited by examiner

Primary Examiner—Krisna Lim
Assistant Examiner—Philip S. Scuderi
(74) Attorney, Agent, or Firm—Foley & Lardner LLP

(57) ABSTRACT

A distribution system for distributing an application from a distribution server to a user terminal through a communication network, in which the distribution server optimizes a program code of the application in question based on execution data indicative of execution conditions of the application in question at the user terminal in question to distribute the obtained application to the user terminal and the user terminal includes a unit for obtaining a program code and execution data of an application from the distribution server to execute the obtained program code based on execution conditions of the application in question indicated in the execution data, and a unit for obtaining execution data of an application being executed to transmit the execution data to the distribution server.

27 Claims, 11 Drawing Sheets

APPLICATION DISTRIBUTION SYSTEM, AND DISTRIBUTION SERVER AND DISTRIBUTION METHOD THEREOF

BACKGROUND OF THE INVENTION

1. Field of the Invention

The present invention relates to distribution through a communication network and, more particularly, to a distribution system for distributing an application to a user terminal in response to a request from a user, a distribution server and a distribution method thereof, and a distribution program.

2. Description of the Related Art

One example of a conventional application distribution system is recited in "Java(™) Networking Launching Protocol & API Specification (JSR-56)" published in December 2000 by Sun Microsystems. An application distribution system of this kind is a system for conducting centralized management of a plurality of applications by a server and distributing an application to a user terminal in response to a request from a user.

FIG. 11 is a block diagram showing an example of a structure of a conventional application distribution system. The entire structure is made up of a distribution server 40 having a function of distributing an application, user terminals 50-1 to 50-n and an information transfer device 60 such as a Web server for connecting the distribution server 40 and each of the user terminals 50-1 to 50-n through a network.

The distribution server 40 includes a user authentication unit 41 for authenticating a user, a program code management unit 42 for managing a program code (yet to be optimized) of an application to be distributed and a user data management unit 43 for managing a setting file and a data file of an application so as to be correlated with each user.

Each of the user terminals 50-1 to 50-n has the same structure and includes an application management unit 51 having a function of obtaining an application from the distribution server 40 and executing the same.

Thus structured conventional application distribution system operates in a following manner. FIG. 12 is a flow chart showing processing of the distribution server 40. With reference to FIG. 12, processing will be described which is conducted when accepting an application acquisition request form the user terminal 50-1.

First, the user authentication unit 41 of the distribution server 40 receives a message indicative of an application acquisition request from the application management unit 51 included in the user terminal 50-1 (Step 1201). The message is composed of, for example, a name of a requested application, a name of a user which certifies character of a user as a requesting source and authentication information such as a password.

The user authentication unit 41 authenticates the user using the authentication information included in the above-described message (Step 1202). When the authentication fails (NO at Step 1202), the unit 41 returns an error (Step 1206). When the authentication succeeds (YES at Step 1202), the user authentication unit 41 obtains a program code of an application specified by the above message from the program code management unit 42 (Step 1203).

Next, the user authentication unit 41 obtains, from the user data management unit 43, the user data such as a setting file and a data file which is owned by the authenticated user and corresponding to the application included in the above message (Step 1204).

Lastly, the user authentication unit 41 distributes the program code and the user data obtained at Steps 1203 and 1204 as one application to the user terminal 50-1.

The conventional technique employs a system of transferring program codes forming an application to a user terminal without modification, which results in transfer of codes that are included in the program code and will not be used on the user terminal as well to accordingly cause wasteful use of communication traffic.

SUMMARY OF THE INVENTION

An object of the present invention is to eliminate the above-described conventional shortcomings and provide a distribution system, a distribution server and a distribution method thereof, and a distribution program which realize reduction in the amount of communication involved in application distribution and reduction in the amount of memory consumed by an application executed on a user terminal by distributing an application with a redundant part eliminated which is not surely used on a user terminal.

Another object of the present invention is to eliminate the above-described conventional shortcomings and provide a distribution system, a distribution server and a distribution method thereof, and a distribution program for automatically removing, based on execution data indicative of execution conditions of an application on a user terminal, a redundant part from a program code of an application to be transferred which is not surely used on the user terminal and distributing the obtained application.

According to the first aspect of the invention, an application distribution system for distributing an application from a distribution server to a user terminal through a communication network, wherein the distribution server optimizes a program code of the application based on execution data indicative of execution conditions of the application at the user terminal to distribute the application to the user terminal.

In the preferred construction, the user terminal comprises an execution data processing unit for obtaining a program code and execution data of the application from the server to execute the obtained program code based on execution conditions of the application in question indicated in the execution data, and an application management unit for obtaining the execution data of the application being executed to transmit the execution data to the distribution server.

In another preferred construction, the distribution server, at the time of distribution of the application to the user terminal, transmits a program code of the application in question, execution data of the application in question at the user terminal in question and user data as a setting file and a data file for use by the application in question at the user terminal in question in the lump to the user terminal in question, the execution data processing unit of the user terminal executes a program code of the application distributed from the distribution server based on the execution data and the user data of the application in question, and the application management unit of the user terminal obtains the execution data and the user data of the application being executed to transmit the obtained data to the distribution server.

In another preferred construction, the execution data includes information about a program counter, a heap and a stack during the execution of the application.

In another preferred construction, the execution data includes information about a value of an instance variable of each object generated on a memory when the application is being executed.

In another preferred construction, the distribution server comprises a user authentication unit for authenticating a user of each the user terminal, a program code management unit for managing a program code of the application yet to be optimized, an execution data management unit for managing execution data of the application at each the user terminal, a user data management unit for managing user data of the application at each the user terminal, and a code optimization unit for optimizing the program code of the application yet to be optimized based on the execution data to generate an optimized program code.

In another preferred construction, the code optimization unit of the distribution server comprises code extraction means for specifying, based on the execution data in a user terminal at a distribution destination of the application in question, a part of a program code of the application which is not surely executed at the user terminal of the distribution destination and deleting the specified part to newly generate a program code of the application in question including only a code which is likely to be executed, and code compression means for compressing a new program code of the application generated by the code extraction means to generate a new compressed program code of the application in question, and wherein the new program code of the application generated by the code compression means is transmitted as an optimized program code of the application in question to the user terminal of the distribution destination.

In another preferred construction, the distribution server comprises a cache unit for temporarily preserving an optimized program code generated by the code optimization unit.

In another preferred construction, the user terminal comprises an information disclosing unit for obtaining user terminal information as information of the user terminal in question, and the distribution server comprises an information analysis unit for selecting a program code of an application to be distributed to the user terminal in question based on user terminal information of the user terminal obtained by the information disclosing unit.

In another preferred construction, the user terminal information comprises information about a class library stored in the user terminal in question, and the information analysis unit of the distribution server deletes a class library which is indicated by the user terminal information and stored in a user terminal of a distribution destination from a program code of the application to be distributed to the user terminal in question.

In another preferred construction, the application distribution system comprises an information transfer device for connecting the distribution server and the communication network to relay communication between the distribution server and each the user terminal.

In another preferred construction, the communication network is the Internet, and the information transfer device has a function of a web server to communicate with the distribution server by using a servlet.

According to the second aspect of the invention, a distribution server for distributing an application to a user terminal through a communication network, which optimizes a program code of the application in question based on execution data indicative of execution conditions of the application in question at the user terminal in question to distribute the application to the user terminal.

In the preferred construction, the distribution server comprises means for transmitting, at the time of distribution of the application to the user terminal, a program code of the application in question, execution data of the application in question at the user terminal in question and user data as a setting file and a data file for use by the application in question at the user terminal in question in the lump to the user terminal in question, and means for obtaining the execution data and the user data of the application from the user terminal through the communication network to register the obtained data.

In another preferred construction, the distribution server comprises a user authentication unit for authenticating a user of each the user terminal, a program code management unit for managing a program code of the application yet to be optimized, an execution data management unit for managing execution data of the application at each the user terminal, a user data management unit for managing user data of the application at each the user terminal, and a code optimization unit for optimizing the program code of the application yet to be optimized based on the execution data to generate an optimized program code.

In another preferred construction, the code optimization unit comprises code extraction means for specifying, based on the execution data in the user terminal at a distribution destination of the application in question, a part of a program code of the application which is not surely executed at the user terminal of the distribution destination and deleting the specified part to newly generate a program code of the application in question including only a code which is likely to be executed.

In another preferred construction, the code optimization unit comprises code compression means for compressing a new program code of the application generated by the code extraction means to generate a new compressed program code of the application in question.

In another preferred construction, the code optimization unit comprises code extraction means for specifying, based on the execution data in a user terminal at a distribution destination of the application in question, a part of a program code of the application which is not surely executed at the user terminal of the distribution destination and deleting the specified part to newly generate a program code of the application in question including only a code which is likely to be executed, and code compression means for compressing a new program code of the application generated by the code extraction means to generate a new compressed program code of the application in question, and wherein the new program code of the application generated by the code compression means is transmitted as an optimized program code of the application in question to the user terminal of the distribution destination.

In another preferred construction, the distribution server comprises a cache unit for temporarily preserving an optimized program code generated by the code optimization unit.

In another preferred construction, the distribution server comprises an information analysis unit for obtaining user terminal information as information of the user terminal in question from the user terminal to select a program code of an application to be distributed to the user terminal in question based on the user terminal information.

In another preferred construction, the user terminal information includes information about a class library stored in the user terminal in question, and the information analysis unit deletes a class library which is indicated by the user terminal information and stored in a user terminal of a distribution destination from a program code of the application to be distributed to the user terminal in question.

According to the third aspect of the invention, a terminal device for accepting distribution of an application from a distribution server through a communication network to execute the application, comprises an application management unit for obtaining execution data indicative of execution conditions of the application being executed to transmit the execution data to the distribution server, and an execution data processing unit for obtaining a program code of the application and the execution data of the application in question from the distribution server to execute the obtained program code based on execution conditions of the application in question indicated in the execution data.

In the preferred construction, the terminal device, at the time of distribution of the application from the distribution server, receives a program code of the application in question, execution data of the application in question at the terminal device in question and user data as a setting file and a data file for use by the application in question at the terminal device in question in the lump, wherein the application management unit causes a program code of the application distributed from the distribution server to be executed based on the execution data and the user data of the application in question, and the execution data processing unit obtains the execution data and the user data of the application being executed to transmit the obtained data to the distribution server.

In another preferred construction, the terminal device comprises an information disclosing unit for obtaining user terminal information as information of the user terminal in question, and which transmits the user terminal information of the terminal device in question obtained by the information disclosing unit to the distribution server.

According to another aspect of the invention, an application distribution method of distributing an application to a user terminal through a communication network, comprising the step of optimizing a program code of the application in question based on execution data indicative of execution conditions of the application in question at the user terminal in question to distribute the application to the user terminal.

In the preferred construction, the application distribution method comprises the steps of transmitting, at the time of distribution of the application to the user terminal, a program code of the application in question, execution data of the application in question at the user terminal in question and user data as a setting file and a data file for use by the application in question at the user terminal in question in the lump to the user terminal in question, and obtaining the execution data and the user data of the application from the user terminal through the communication network to register the obtained data.

In another preferred construction, the application distribution method further comprises a user authentication step of authenticating a user of each the user terminal, a program code management step of managing a program code of the application yet to be optimized, an execution data management step of managing execution data of the application at each the user terminal, a user data management step of managing user data of the application at each the user terminal, and a code optimization step of optimizing the program code of the application yet to be optimized based on the execution data to generate an optimized program code.

In another preferred construction, the code optimization step includes a code extraction step of specifying, based on the execution data in a user terminal at a distribution destination of the application in question, a part of a program code of the application which is not surely executed at the user terminal of the distribution destination and deleting the specified part to newly generate a program code of the application in question including only a code which is likely to be executed, and a code compression step of compressing a new program code of the application generated by the code extraction step to generate a new compressed program code of the application in question, and wherein the new program code of the application generated at the code compression step is transmitted as an optimized program code of the application in question to the user terminal of the distribution destination.

In another preferred construction, the application distribution method comprises a cache step of temporarily preserving an optimized program code generated at the code optimization step.

In another preferred construction, the application distribution method comprises an information analysis step of obtaining user terminal information as information of the user terminal in question from the user terminal to select a program code of an application to be distributed to the user terminal in question based on the user terminal information.

In another preferred construction, the user terminal information includes information about a class library stored in the user terminal in question, and at the information analysis step, a class library which is indicated by the user terminal information and stored in a user terminal of a distribution destination is deleted from a program code of the application to be distributed to the user terminal in question.

According to a still further aspect of the invention, an application distribution program for distributing an application to a user terminal through a communication network by controlling a computer, comprising the function of optimizing a program code of the application in question based on execution data indicative of execution conditions of the application in question at the user terminal in question to distribute the application to the user terminal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

Figure 1:
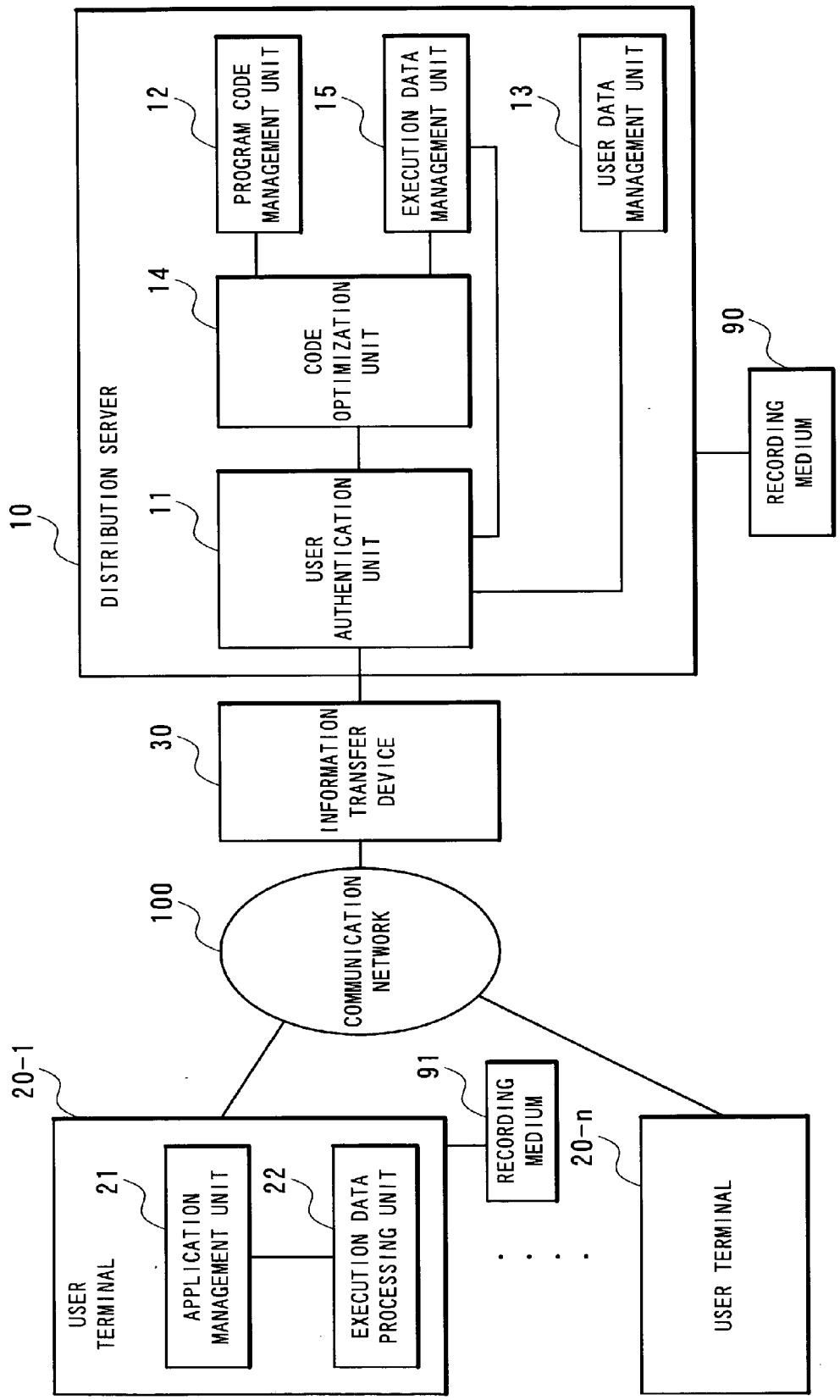
FIG. 1 is a block diagram showing a structure of a distribution system according to a first embodiment of the present invention.

FIG. 1 is a block diagram showing a structure of a distribution system according to a first embodiment of the present invention. With reference to FIG. 1, the distribution system of the present embodiment includes a distribution server 10 having a function of optimizing a code and distributing an obtained application and user terminals 20-1 to 20-n as a terminal device used by each user which are connected through a communication network 100.

The distribution server 10 uses an information transfer device 30 for the connection with the communication network 100. The information transfer device 30 has such a function as a web server or other to receive connection from the user terminals 20-1 to 20-n through the communication network 100. Kind of communication network 100 is not necessarily limited and such a network as the Internet or LAN can be used. In addition, the number n of user terminals is not limited in particular and it may be an arbitrary number.

Each of the user terminals 20-1 to 20-n has the same structure and includes an application management unit 21 for obtaining an application from the distribution server 10 and an execution data processing unit 22 for causing processing of an application to be executed. The execution data processing unit 22 causes processing of an obtained program to be resumed based on a program code obtained from the distribution server 10 and execution data indicative of execution conditions of the application in question at a relevant user terminal.

The application management unit 21 obtains a requested application from the distribution server 10 through the information transfer device 30. Application here distributed by the distribution server 10 of the present embodiment is composed of, for example, an optimized program code, user data and execution data.

The application management unit 21 transfers the optimized program code and the execution data obtained from the distribution server 10 to the execution data processing unit 22 to cause calculation of the application to be resumed. The application management unit 21 also obtains latest execution data from the execution data processing unit 22 and transfers the user data and the execution data to a user authentication unit 11 of the distribution server 10 to cause the user data and the execution data to be preserved in the distribution server 10.

Here, as data indicative of execution conditions of an application at a relevant user terminal, the execution data can be formed based on various information. The data can be formed, for example, with such information as a program counter, a heap and a stack during (at a predetermined time of) the execution of the application or with a value of an instance variable of all (or a designated part of) the objects generated on a memory during the execution of the application.

User data is, for example, a setting file of an application or a data file such as document data or image data. The user data, as in this example, is data to be written by an application into a non-volatile storage medium such a hard disc. User data in general exists for each user of an application and is owned by a user.

Upon obtaining the optimized program code and the execution data from the application management unit 21, the execution data processing unit 22 causes the calculation of the application to be resumed using the optimized program code and the execution data. The application obtains the user data from the application management unit 21 as required to execute the processing. The execution data processing unit 22 also obtains execution data of the application being executed from the same and transfers the obtained execution data to the application management unit 21.

The distribution server 10, which is realized by a program-controlled CPU or the like, includes the user authentication unit 11 for authenticating a user, a program code management unit 12 for managing an application to be distributed, a user data management unit 13 for managing a setting file and a data file of an application, a code optimization unit 14 for optimizing a code and an execution data management unit 15 for managing execution data preserving information indicative of execution conditions of calculation of an application program.

The user authentication unit 11 has a function of authenticating a user. The user authentication unit 11 receives an application transfer request from the application management unit 21 through the information transfer device 30, obtains an optimized program code from the code optimization unit 14, obtains execution data from the execution data management unit 15 and obtains user data from the user data management unit 13 to transfer the optimized program code, the execution data and the user data as one application to the application management unit 21.

The program code management unit 12 manages a program code so as to be correlated, for example, with a name of an application. When the code optimization unit 14 requests a program code from the program code management unit 12 with a name of a program designated, the program code management unit 12 returns the designated program code.

The user data management unit 13 manages user data for use by a program managed by the program code management unit 12 so as to be correlated, for example, with a pair of a name of a user and a name of an application. When the user authentication unit 11 authenticates a user of each user terminal 20-$i$ ($i=1, \ldots, n$) and requests user data from the user data management unit 13 by using the name of the authenticated user and the name of the application requested by each user terminal 20-$i$ ($i=1, \ldots, n$), the user data management unit 13 returns the designated user data.

The execution data management unit 15 manages execution data preserving information indicative of execution conditions of calculation of an application program operating on the user terminals 20-1 to 20-$n$. Execution data is managed so as to be correlated, for example, with a pair of a name of a user and a name of an application.

Upon receiving a request by using a name of a user and a name of an application requested by the user terminal 20-$i$ ($i=1, \ldots, n$) from the code optimization unit 14 or the user authentication unit 11, the execution data management unit 15 returns the designated execution data. The execution data is generated by the execution data processing unit 22 at the end of the processing of the application operating on the user terminal 20-$i$ ($i=1, \ldots, n$) and the generated execution data is transferred to the application management unit 21 of the same user terminal 20-$i$, so that the application management unit 21 transfers the execution data through the user authentication unit 11 to the execution data management unit 15 where the data is preserved ultimately.

The code optimization unit 14 has a function of generating an optimized program code based on a program code and execution data. The code optimization unit 14 receives a name of an authenticated user and a name of an application requested by the user terminal 20-$i$ ($i=1 \ldots n$) from the user authentication unit 11. Next, the code optimization unit 14 obtains a program code by using the name of the requested application from the program code management unit 12 and obtains execution data from the execution data management unit 15 by using the name of the authenticated user and the name of the requested application. Then, the code optimization unit 14 optimizes the program code by using the execution data and returns the optimized program code to the user authentication unit 11.

Figure 2:
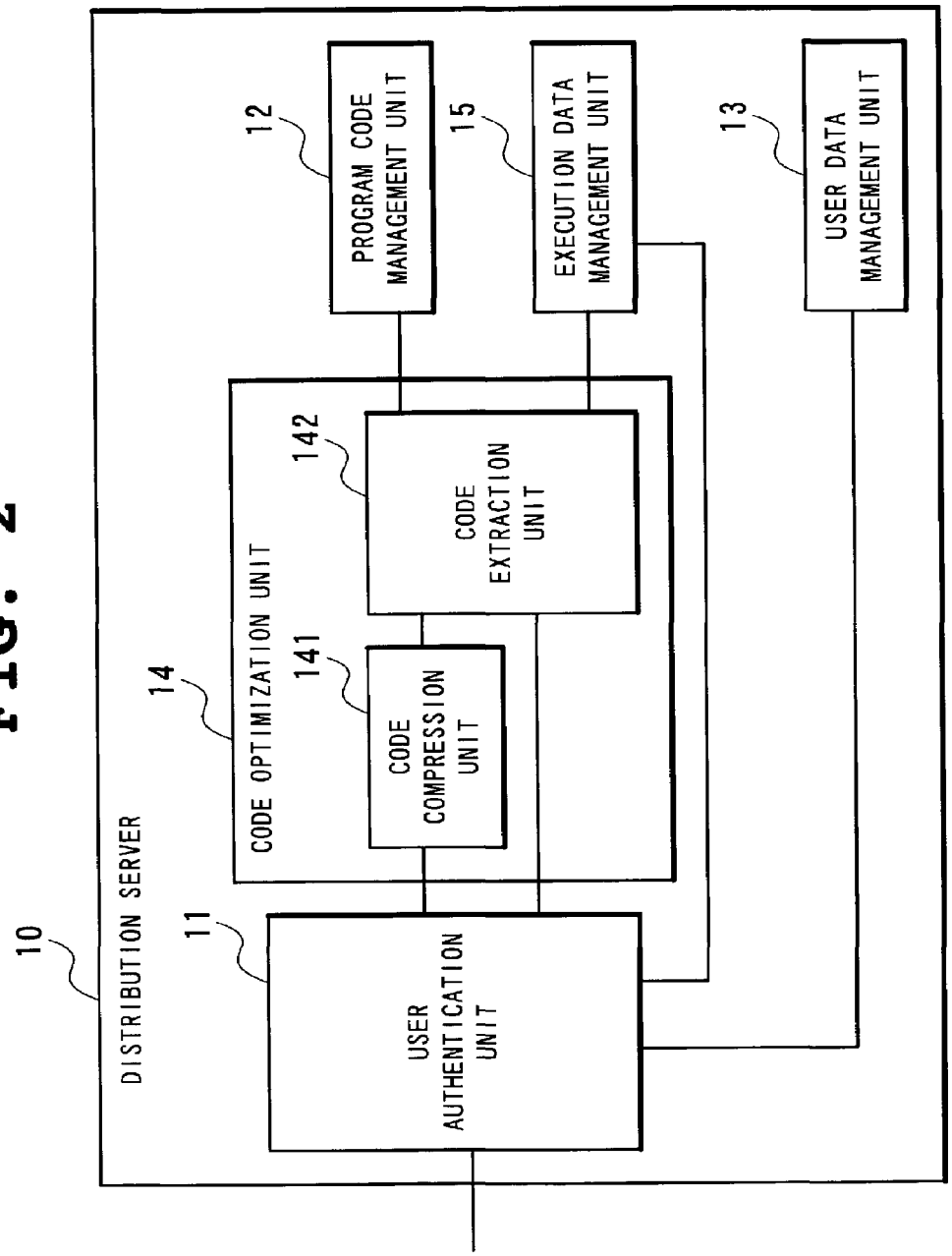
FIG. 2 is a block diagram showing a structure of a distribution server according to the first embodiment of the present invention.

As to the code optimization unit 14, its structure will be described in more detail. FIG. 2 is a block diagram showing one example of a structure of the distribution server 10 according to the present embodiment, and as shown in FIG. 2, the code optimization unit 14 of the present embodiment includes a code compression unit 141 and a code extraction unit 142.

The code extraction unit 142 has a function of removing an unnecessary part of a program code by using execution data. The user authentication unit 11 requests generation of an optimized code from the code extraction unit 142 by using a name of an authenticated user and a name of a requested application. The code extraction unit 142 obtains a program code from the program code management unit 12 by using the name of the requested application and obtains execution data from the execution data management unit 15 by using the name of the authenticated user and the name of the requested application. The code extraction unit 142 analyzes a program code and using execution data, specifies a part which is not surely executed when calculation of the application is resumed using the execution data and the program code to newly generate a program code including only a code which is likely to be executed. The generated code is transferred to the code compression unit 141.

For specifying a part which is not surely executed when a program code is resumed based on execution data, the code extraction unit 142 is allowed to use, for example, a method of conducting static analyses based on a specific program counter indicated in the execution data to generate a tree for function call and when whether a condition of a control statement is true or false can be found from the execution data, cutting out a partial tree not to be called from the function call tree to determine a field, a function, or a class in a case of an object oriented language, which is not to be used from the ultimately obtained tree.

The code compression unit 141 has a function of compressing a program code. Upon receiving a program code subjected to code extraction processing from the code extraction unit 142, the code compression unit 141 newly generates a compressed program code from the received program code and transfers the generated program code to the user authentication unit 11.

For compressing a code, the code compression unit 141, for example, in a case of an object oriented language, is allowed to use such a method of shortening a name of a class or a method and a method of reducing the number of classes by modification of a class hierarchy or fusion of classes while maintaining original intention of a program.

In a case where the communication network 100 is the Internet and the information transfer device 30 has a function of a web server, communication between the application management unit 21 of each user terminal and the information transfer device 30 can be realized with ease by using, for example, HTTP recited in "RFC2616, Hypertext Transfer Protocol-HTTP/1.1, June 1999". In this case, communication between the information transfer device 30 and the distribution server 10 can be realized with ease using, for example, a Web server and a servlet recited in "Java Servlet Specification, v2.2, Sun Microsystems, December 1999".

Next, with reference to the flow charts of FIGS. 3 to 6 and the data structure shown in FIG. 7, entire operation of the first embodiment will be described in detail.

Figure 3:
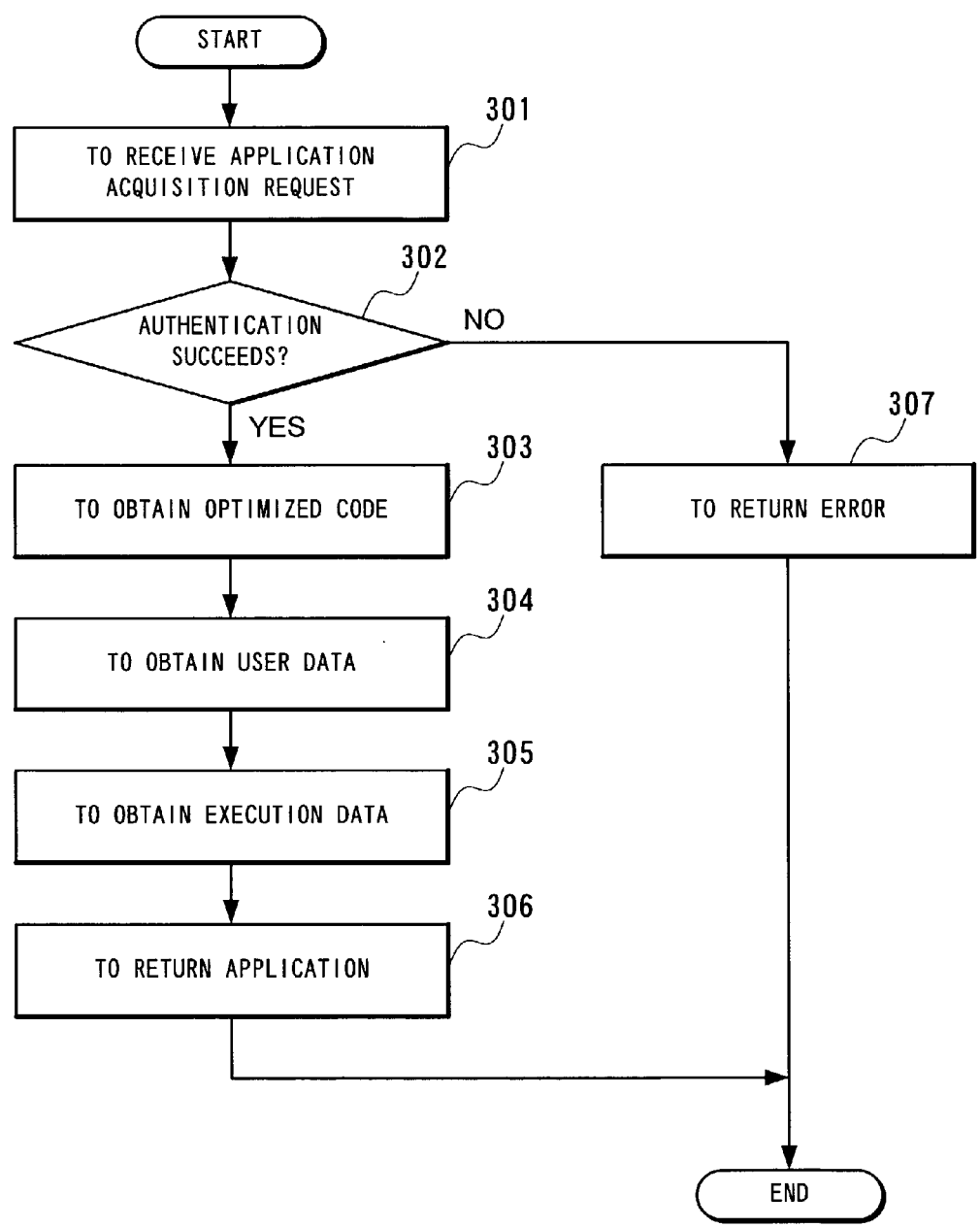
FIG. 3 is a flow chart for use in explaining processing of the distribution server according to the first embodiment of the present invention.

FIG. 3 is a flow chart showing a flow of processing conducted from when the distribution server 10 receives an application acquisition request from the user terminal 20-$i$ ($i=1 \ldots n$) until when it returns an application including an optimized program code.

Figure 4:
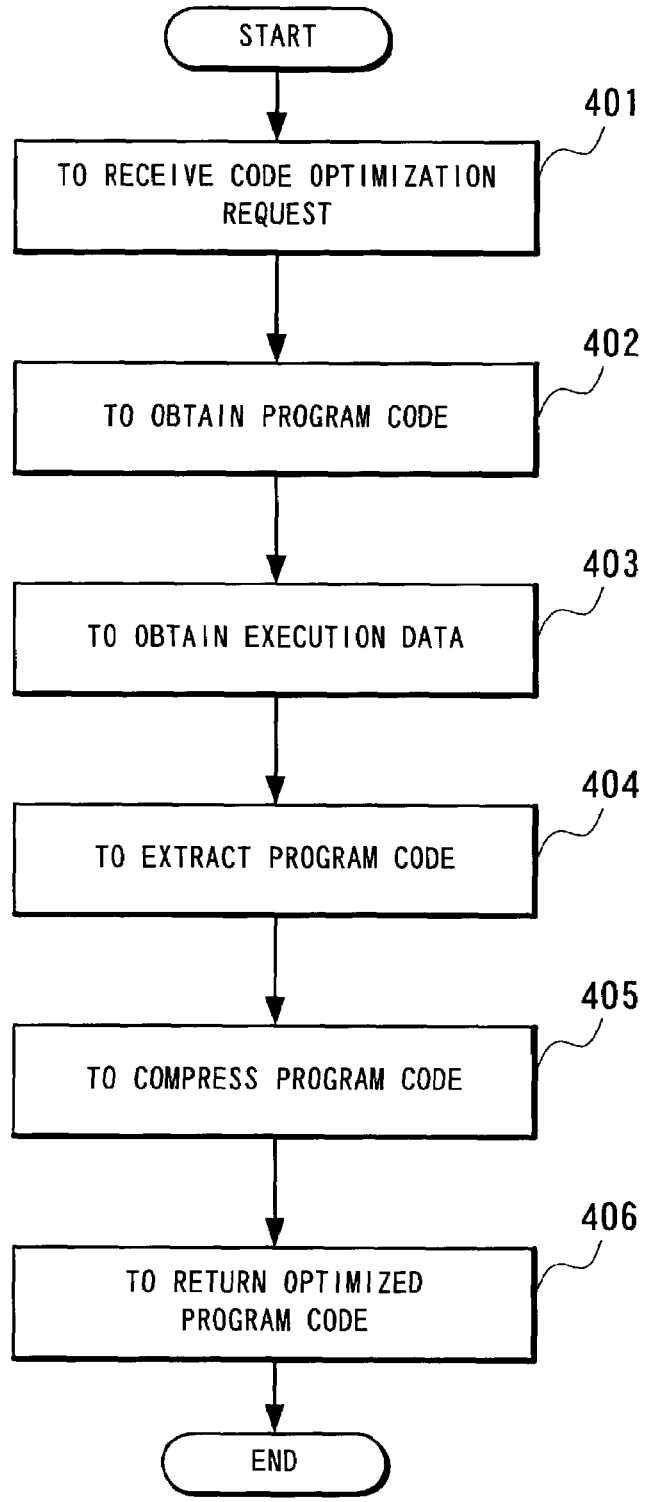
FIG. 4 is a flow chart for use in explaining processing of a code optimization unit according to the first embodiment of the present invention.

FIG. 4 is a flow chart showing processing of obtaining an optimized program code conducted at Step 303 of FIG. 3 in more detail, which shows a flow of processing conducted by the code optimization unit 14 to optimize a program code.

Figure 5:
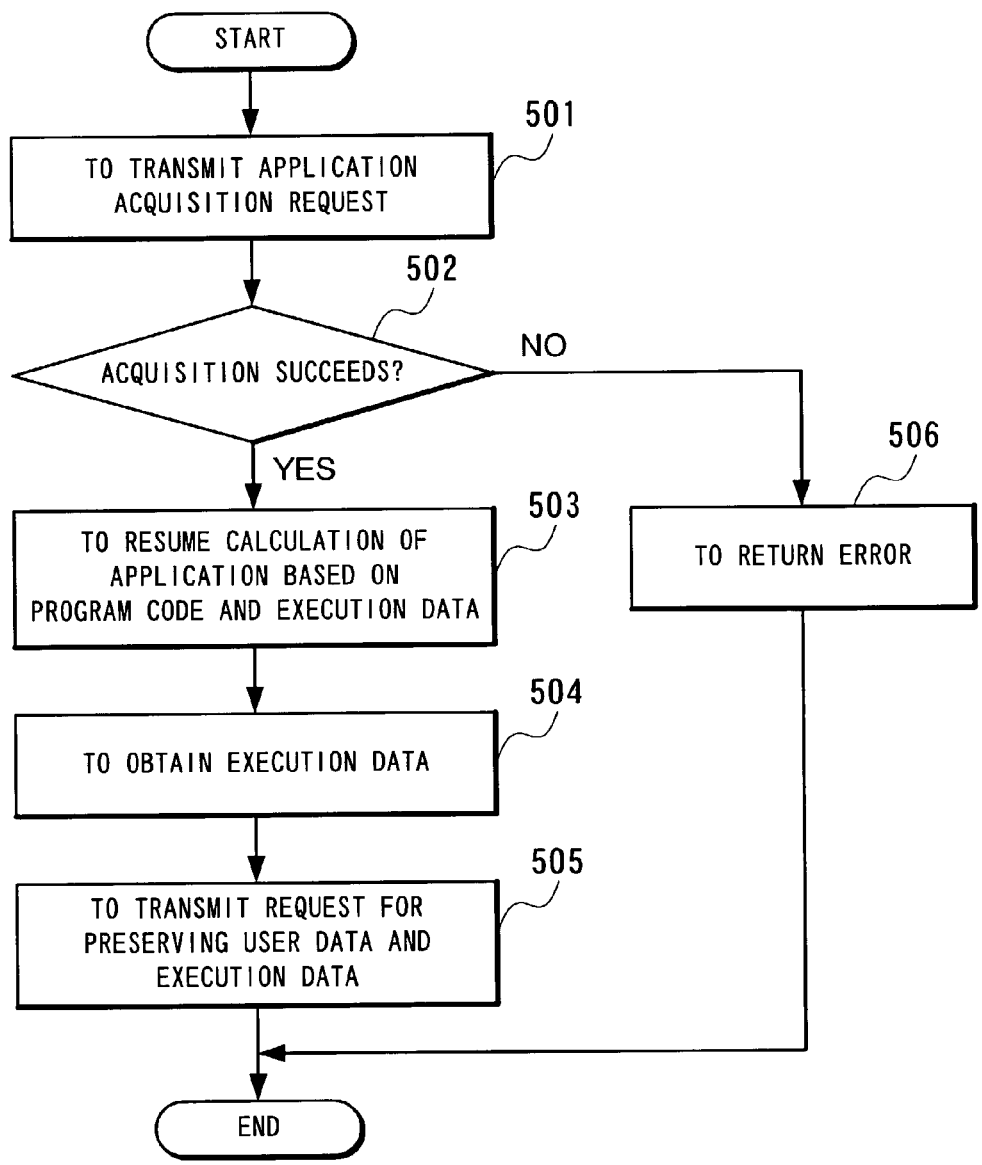
FIG. 5 is a flow chart for use in explaining processing of a user terminal according to the first embodiment of the present invention.

FIG. 5 is a flow chart showing a flow of processing conducted from when the user terminals 20-1 to 20-$n$ obtain an application from the distribution server 10 to execute the application until when they transfer user data and execution data to the distribution server 10.

Figure 6:
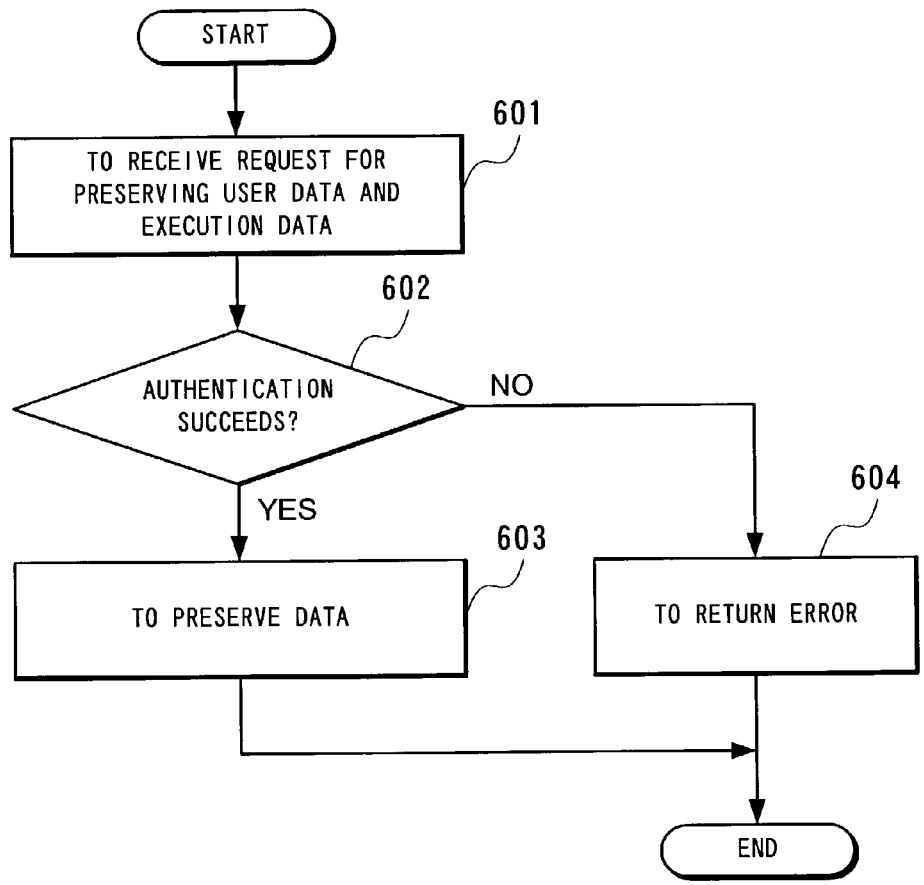
FIG. 6 is a flow chart for use in explaining processing conducted by the distribution server to receive user data and execution data according to the first embodiment of the present invention.

FIG. 6 is a flow chart showing a flow of processing conducted by the distribution server 10 to receive a user data and execution data preservation request from the user terminal 20-$i$ and store the data.

Figure 7:
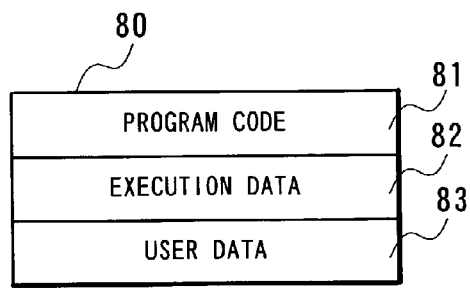
FIG. 7 is a diagram showing one example of a data structure of an application according to the first embodiment of the present invention.

FIG. 7 is a diagram showing one example of a data structure of an application 80 to be transferred from the distribution server 10 to the user terminals 20-1 to 20-$n$, in which the application 80 includes a program code 81, execution data 82 and user data 83. Hereinafter, description will be made premised on that the application 80 includes these information.

First, when receiving a request from a user who uses the user terminal 20-i, the application management unit 21 transmits an application acquisition request to the distribution server 10 (FIG. 5, Step 501). The application management unit 21 is assumed to hold information about a place of the distribution server 10 to be interpreted by the information transfer device 30 as a result of the setting made by the user of the user terminal 20-i or other. More specifically, as the place of the distribution server 10, the uniform resource locator, for example, is used. Information transmitted as an application acquisition request from the application management unit 21 to the distribution server 10 includes a name of an application to be acquired and authentication information certifying character of the user using the user terminal 20-i without fail. Used as the authentication information are, for example, a user name and a password.

The user authentication unit 11 in the distribution server 10 receives the application acquisition request from the application management unit 21 (FIG. 3, Step 301). The user authentication unit 11 authenticates the user of the user terminal 20-i by using the authentication information of the user of the user terminal 20-i contained in the application acquisition request and an authentication data base internally held in the application management unit 21 (FIG. 3, Step 302). When the authentication fails, (FIG. 3, NO at Step 302), the application management unit 21 returns the error to the application management unit 21 of the user terminal 20-i (FIG. 3, Step 307). When the authentication succeeds (FIG. 3, YES at Step 302), the user authentication unit 11 obtains an optimized program code of the requested application from the code optimization unit 14 (FIG. 3, Step 303).

More detailed description of the processing at Step 303 of FIG. 3 will be as follows. The code extraction unit 142 in the code optimization unit 14 receives a code optimization request from the user authentication unit 11 (FIG. 4, Step 401). The code optimization request includes the name of the application and information of the user obtained by the authentication at Step 302 of FIG. 3. As the user information, for example, a name of a user, an identifier unitarily assigned to a user or the like is used. The user data management unit 13 and the execution data management unit 15 manage data so as to correspond to user information and an application name. In the present embodiment, a user's name will be used as user information. Next, the code extraction unit 142 obtains a program code from the program code management unit 12 by using the application name included in the code optimization request (FIG. 4, Step 402).

Next, the code extraction unit 142 obtains execution data from the execution data management unit 15 by using the name of the application and the name of the user contained in the code optimization request (FIG. 4, Step 403). The code extraction unit 142 specifies a part which is not surely executed when calculation of the application is resumed by using the execution data and a program code to newly generate a program code including only a code which is likely to be executed (FIG. 4, Step 404). The program code newly generated by the code extraction unit 142 is sent to the code compression unit 141 which will generate a new compressed program code from the sent-in program code by using, for example, class fusion (FIG. 4, Step 405). Lastly, the code compressing unit 141 returns the optimized program code extracted and compressed to the user authentication unit 11 (FIG. 4, Step 406).

Upon obtaining the optimized program code by the above-described processing, the user authentication unit 11 then obtains user data from the user data management unit 13 by using the name of the requested application and the name of the authenticated user (FIG. 3, Step 304). Similarly, the user authentication unit 11 obtains execution data from the execution data management unit 15 by using the name of the requested application and the name of the authenticated user (FIG. 3, Step 305). The user authentication unit 11 structures the application 80 (FIG. 7) with the optimized program code, the execution data and the user data obtained by the processing so far and transfers the application 80 to the application management unit 21 of the user terminal 20-i as an application requesting source (FIG. 3, Step 306).

When failing to obtain an application due to a failure of authentication etc. (FIG. 5, NO at Step 502), the application management unit 21 of the user terminal 20-i notifies the user of, for example, the failure to end the processing (FIG. 5, Step 506). When succeeding in obtaining the application (FIG. 5, YES at Step 502), the application management unit 21 transfers the program code and the execution data of the application 80 to the execution data processing unit 22 which will resume calculation of the application based on the program code and the execution data (FIG. 5, Step 503).

Between Step 503 and Step 504 of FIG. 5, the user uses the application.

By a request implicitly made by the user of the user terminal 20-i for preservation or by automatic determination by the execution data processing unit 22, the execution data processing unit 22 obtains the execution data of the application being executed (FIG. 5, Step 504).

When the execution data processing unit 22 transfers the obtained execution data to the application management unit 21, the application management unit 21 transmits a request for preserving the user data and the execution data to the distribution server 10 (FIG. 5, Step 505). The preservation request includes user data, execution data, a name of an application and authentication information certifying character of the user of the user terminal 20-i.

The user authentication unit 11 in the distribution server 10 accepts the request for preserving the user data and the execution data (FIG. 6, Step 601) to authenticate the user of the user terminal 20-i as a requesting source (FIG. 6, Step 602). When failing in the authentication (FIG. 6, NO at Step 602), the user authentication unit 11 returns the error to the application management 21 of the user terminal 20-i (FIG. 6, Step 604). When succeeding in the authentication (FIG. 6, YES at Step 602), the user authentication unit 11 stores the user data in the user data management unit 13 by using the name of the application and the user data included in the preservation request and the name of the user obtained by the authentication and stores the execution data in the execution data management unit 15 by using the name of the application and the execution data included in the preservation request and the name of the user obtained by the authentication (FIG. 6, Step 603).

As described in the foregoing, at the time of distribution of an application, based on execution data indicative of calculation execution conditions of an application program at each user terminal, the distribution system according to the present embodiment conducts code optimization of removing a redundant part which is not surely used by a user terminal at a distribution destination from a program code to enable distribution of the optimized program code to the user terminal.

As a result, the amount of program code of the application to be distributed can be reduced to realize reduction in the amount of communication involved in application distribution and reduction in the amount of memory consumed by the application executed at the user terminal.

Figure 8:
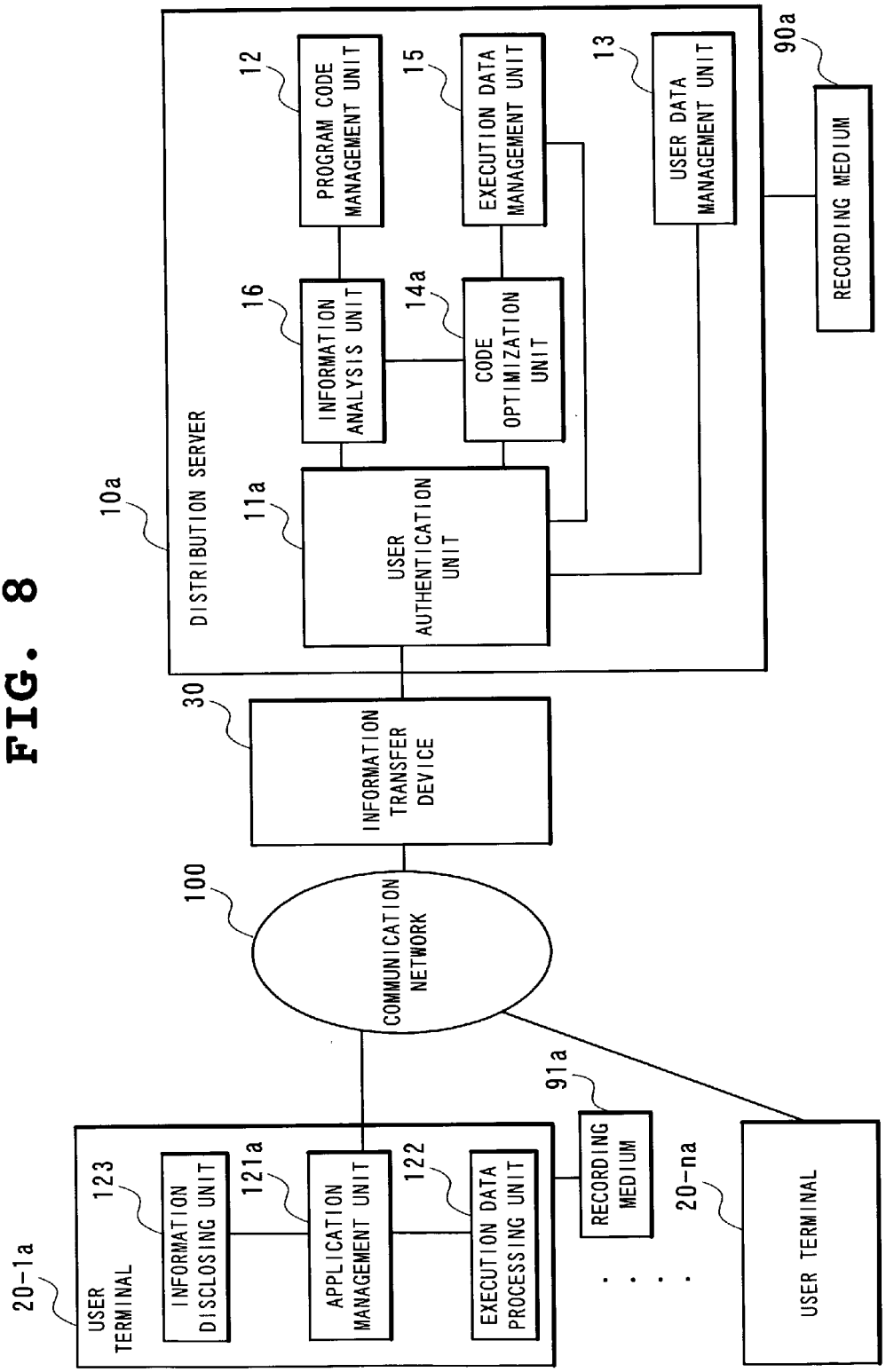
FIG. 8 is a block diagram showing a structure of a distribution system according to a second embodiment of the present invention.

Next, a second embodiment of the present invention will be described in detail. FIG. 8 is a block diagram showing an example of a structure of a distribution system for conducting code optimization to distribute an obtained application according to the second embodiment of the present invention. The present embodiment differs from the first embodiment shown in FIG. 1 in that a distribution server 10a is provided in place of the distribution server 10 and that user terminals 20-1a to 20-na are provided in place of the user terminals 20-1 to 20-n.

The user terminal 20-1a differs from the user terminal 20-1 of the first embodiment in that an information disclosing unit 123 is additionally provided and an application management unit 121a is provided in place of the application management unit 21. The other user terminals 20-2a to 20-na have the same structure as that of the user terminal 20-1a.

The information disclosing unit 123 obtains and provides user terminal information as information of the user terminal in question in response to a request from the application management unit 121a.

User terminal information here is composed of information related to hardware resources, information related to software resources and the like. Information related to hardware resources includes, for example, a name of an apparatus as the user terminal 20-1a, the size of a screen, the size of a usable volatile memory and the size of a usable non-volatile storage region, while information related to software resources includes names of an application and a class library stored in a non-volatile storage region of the user terminal 20-1a and the like.

The application management unit 121a of the present embodiment differs from the application management unit 21 of the first embodiment firstly in that before requesting an application from a user authentication unit 11a of the distribution server 10a (corresponding to Step 501 in FIG. 5), it obtains user terminal information by using the information disclosing unit 23 and secondly in that information to be transferred from the application management unit 121a to the distribution server 10a as an application acquisition request includes the user terminal information in addition to a name of an application to be obtained and authentication information certifying character of a user using a user terminal.

The distribution server 10a of the present embodiment differs from the distribution server 10 of the first embodiment in that an information analysis unit 16 is additionally provided, that a code optimization unit 14a is provided in place of the code optimizing unit 14 and that the user authentication unit 11a is provided in place of the user authentication unit 11.

The user authentication unit 11a of the present embodiment differs from the user authentication unit 11 of the first embodiment in receiving an application acquisition request containing user terminal information from the application management unit 121a and issuing a code acquisition request to the information analysis unit 16 to obtain an optimized code from the code optimization unit 14a.

The information analysis unit 16 has a function of interpreting user terminal information generated by the information disclosing unit 123 to select a code. As a specific example of user terminal information here, a name of a class library cached in a user terminal is used. Upon discriminating a name of a class library cached based on user terminal information to obtain a program code from the program code management unit 12, the information analysis unit 16 deletes a code corresponding to the cached class library to generate a new program code. The newly generated program code is transferred to the code optimization unit 14a.

Figure 9:
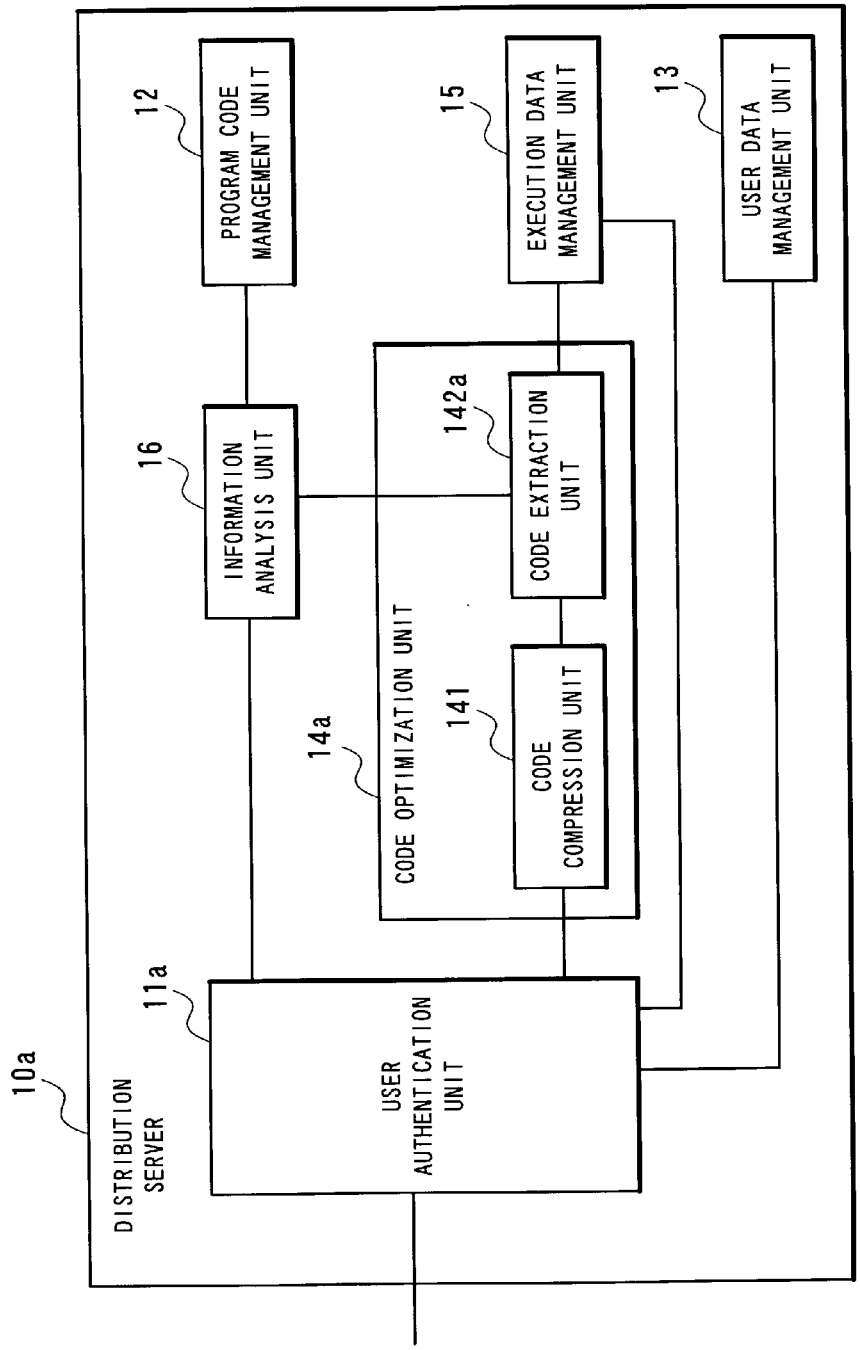
FIG. 9 is a block diagram showing a structure of a distribution server according to the second embodiment of the present invention.

FIG. 9 is a block diagram showing an example of a structure of the code optimization unit 14a of the present embodiment. The code optimization unit 14a of the present embodiment differs from the code optimization unit 14 of the first embodiment in that a code extraction unit 142a is provided in place of the code extraction unit 142 of the first embodiment.

The code extraction unit 142a of the present embodiment differs from the code extraction unit 142 of the first embodiment in obtaining a program code from the information analysis unit 16.

Next, operation of the present embodiment will be described. Here, the description will be made mainly with respect to operation of the information analysis unit 16 and the code optimization unit 14a and not with respect to the processing of the distribution server 10a conducted after obtaining an optimized code because it is the same as in the first embodiment.

After obtaining user terminal information from the information disclosing unit 23, the application management unit 21a sends an application acquisition request to the user authentication unit 11a (corresponding to FIG. 5, Step 501). The application acquisition request includes a name of an application to be obtained, authentication information certifying character of a user using a user terminal and previously obtained user terminal information.

The user authentication unit 11a having received the application acquisition request transfers the name of the requested application, the name of the authenticated user and the user terminal information to the information analysis unit 16 and requests generation of a program code.

Upon receiving the name of the requested application, the name of the authenticated user and the user terminal information from the user authentication unit 11a, the information analysis unit 16 first obtains a program code from the program code management unit 12 by using the name of the application. Next, the information analysis unit 16 analyzes the user terminal information to discriminate a class library cached in the user terminal. Next, the information analysis unit 16 generates a new program code obtained by removing a code equivalent to the cached class library from the obtained program code and transfers the generated program code, the name of the application and the name of the authenticated user to the code extraction unit 142a.

The code extraction unit 142a obtains execution data from the execution data management unit 15 by using the name of the application and the name of the authenticated user and conducts code extraction using the execution data to generate a new program code. The generated program code is transferred to the code compression unit 141. The code compression unit 141 compresses the received program code to newly generate a compressed program code and transfers the same to the user authentication unit 11a.

As described in the foregoing, according to the present embodiment, program codes can be reduced based on not only information from execution data but also user terminal information.

Although in the present embodiment, with each user terminal information held by the information disclosing unit 23 of the relevant user terminal, the user terminal information is transferred from the user terminal to the distribution server 10a every time an application request is made, user terminal information may be held in advance by the information analysis unit 16 on the side of the distribution server 10a as another embodiment. In this case, it is not necessary to transfer the user terminal information to the distribution server 10a from the user terminal every time an application request is made.

Figure 10:
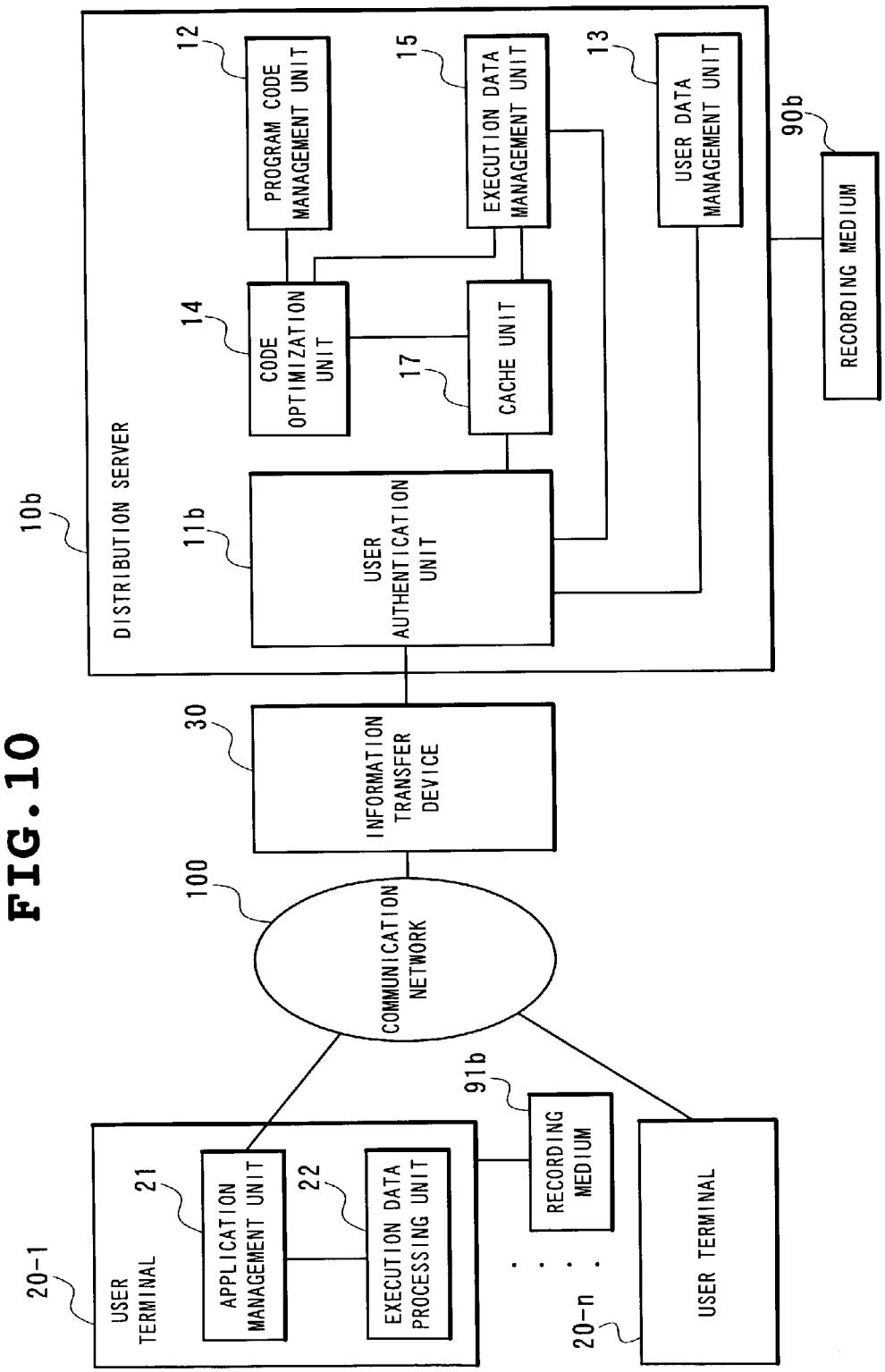
FIG. 10 is a block diagram showing a structure of a distribution system according to a third embodiment of the present invention.
Figure 11:
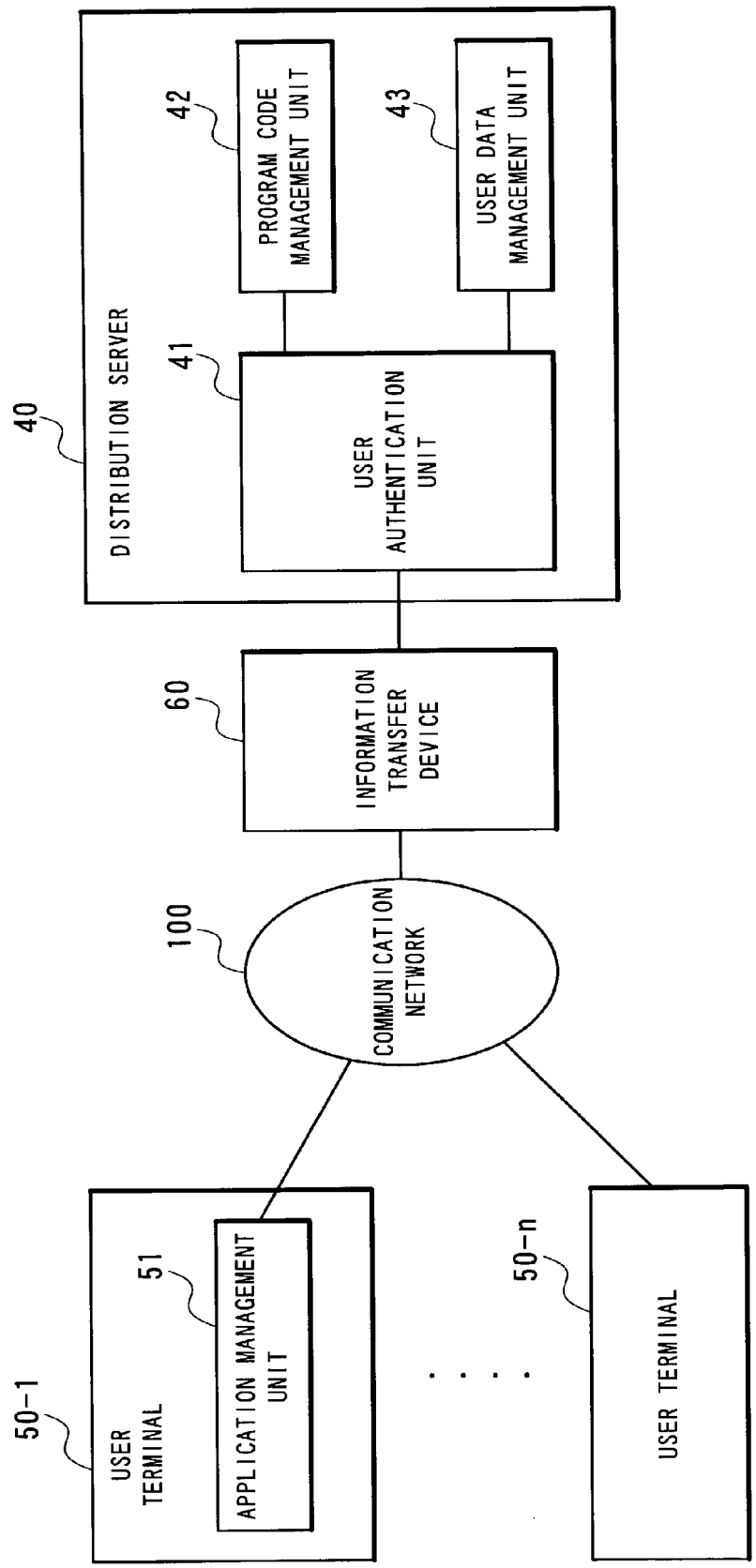
FIG. 11 is a block diagram showing one example of a structure of a conventional application distribution system.
Figure 12:
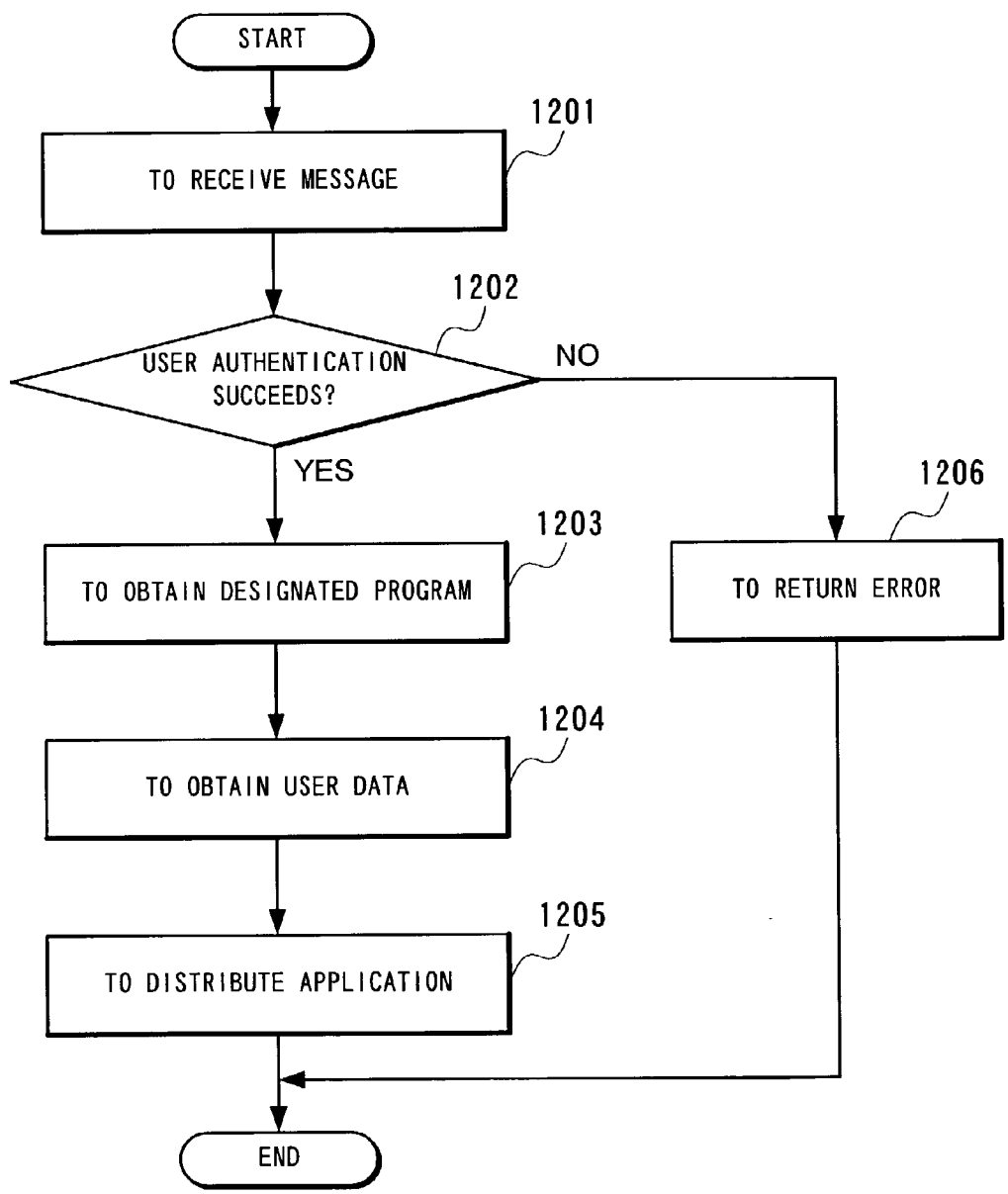
FIG. 12 is a flow chart showing one example of a flow of processing conducted by a conventional server.

Next, a third embodiment of the present invention will be described in detail. FIG. 10 is a block diagram showing an example of a structure of a distribution system for conducting code optimization to distribute an obtained application according to the third embodiment of the present invention. The present embodiment differs from the first embodiment shown in FIG. 1 in that a distribution server 10b is provided in place of the distribution server 10.

The distribution server 10b of the present embodiment differs from the distribution server 10 of the first embodiment in that a cache unit 17 is additionally provided and a user authentication unit 11b is provided in place of the user authentication unit 11.

The user authentication unit 11b of the present embodiment differs from the user authentication unit 11 of the first embodiment in requesting an optimized program code from the cache unit 17.

The cache unit 17 has a function of temporarily storing an optimized program code generated by the code optimization unit 14 in response to a request from the user authentication unit 11b and managing the same. A temporarily stored optimized program code will be referred to as a cached program code. Upon a request from the user authentication unit 11b for an optimized program code, when a cached program code is usable, the unit 17 returns a cached program code and otherwise obtains an optimized program code from the code optimization unit 14 to preserve the obtained program code as a cache, as well as returning the optimized program code to the user authentication unit 11b.

Next, operation of the present embodiment will be described. Description will be here made mainly with respect to operation of the cache unit 17. No description of processing conducted by the distribution server 10b after obtaining an optimized code will be made because it is the same as that of the first embodiment.

Upon receiving an application acquisition request from the application management unit 21, the user authentication unit 11b, after conducting authentication, requests an optimized program code from the cache unit 17 by using a name of an application included in the acquisition request and a name of a user obtained by the authentication.

The cache unit 17 searches currently managed program codes cached for a usable program code and when finding a relevant code, returns the program code to the application management unit 21. When finding no relevant code, the unit 17 obtains an optimized program code from the code optimization unit 14 to preserve the obtained program code as a cache, as well as returning the optimized program code to the user authentication unit 11b. Used as a method of determining whether a cached code is usable or not is, for example, as follows. At the time of storing an optimized code, the cache unit 17 manages the code so as to be correlated with three kinds of information, a name of an application then, a name of a user and a hash value of execution data and upon a request from the user authentication unit 11b, obtains execution data from the execution data management unit 15 by using the name of the requested application and the name of the user, calculates a hash value from the name of the requested application, the name of the user and the execution data and checks whether there exists a cached program code corresponding to the three information to determine whether the program code is usable.

As described in the foregoing, the present embodiment enables optimized program code generation processing by the distribution server 10b to be efficiently conducted by using a cache unit.

As a further embodiment, it is possible to manage and use execution data with user data which is regarded as part of execution data included as one execution data.

In addition, the above-described distribution systems according to the respective embodiments can be implemented in combination with each other.

The above-described distribution systems of the respective embodiments enable the functions of the user authentication units 11, 11a and 11b, the program code management unit 12, the user data management unit 13, the code optimization units 14 and 14a, the code compression unit 141, the code extraction units 142 and 142a, the execution data management unit 15, the information analysis unit 16 and the cache unit 17 of the distribution servers 10, 10a and 10b, the functions of the application management units 21 and 21a, the execution data processing unit 22 and the information disclosing unit 23 of the user terminals 20-1 to 20-n and 20-1a to 20-na and other functions to be realized not only by hardware but also by loading a distribution program as a computer program having the respective functions into a memory of a computer processing device. The computer program is stored in recording media 90, 90a, 90b, 91, 91a and 91b such as magnetic discs and semiconductor memories. Then, loading the program from the recording media into the computer processing device to control operation of the computer processing device realizes the above-described functions.

Although the present invention has been described with respect to the preferred modes and embodiments in the foregoing, the present invention is not necessarily limited to the above-described preferred modes and embodiments but realized as variation within a scope of its technical idea.

As described in the foregoing, the distribution system, the distribution server and the distribution method thereof, and the distribution program of the present invention attain the following effects.

First, according to the present invention, at the time of distribution of an application, based on execution data indicative of calculation execution conditions of an application program at each user terminal, code optimization is conducted of removing a redundant part which is not surely used by a user terminal at a distribution destination from a program code to enable distribution of the optimized program code to the user terminal.

As a result, the amount of program code of the application to be distributed can be reduced to realize reduction in the amount of communication involved in application distribution and reduction in the amount of memory consumed by the application executed at the user terminal.

In addition, the second embodiment of the present invention enables efficient program code optimization based on various information about a user terminal such as a class library stored in a hard disc of the user terminal.

Moreover, with a cache unit provided in a distribution server, the third embodiment of the present invention enables distribution of an efficiently optimized program code.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A method in a distribution server, said method comprising:
   obtaining a program code;
   obtaining execution data indicative of one or more execution conditions related to said program code;
   determining an unnecessary part of said program code that would not be executed if said program code were executed in accordance with said one or more execution conditions;
   removing said unnecessary part of said program code from said program code to provide an optimized program code; and
   transmitting said optimized program code to a user terminal over a communication network;
   wherein the step of determining comprises:
      conducting a static analysis of said program code in accordance with said one or more execution conditions; and
      determining, based on said static analysis, said unnecessary part of said program code that would not be executed if said program code were executed in accordance with said one or more execution conditions;
   wherein said execution data includes a value of a program counter at which execution of said program code is to begin;
   wherein said step of conducting said static analysis comprises:
      conducting said static analysis of said program code based on said value of said program counter to generate a tree of function calls; and
   wherein said step of determining comprises:
      determining, based on said static analysis, a partial tree of said tree of function calls that includes functions that will not be called if said program code is executed in accordance with said execution conditions; and
      designating a part of said program code that corresponds to said functions in said partial tree as said unnecessary part of said program code.

2. A method in a distribution server, said method comprising:
   obtaining a program code;
   obtaining execution data indicative of one or more execution conditions related to said program code;
   determining an unnecessary part of said program code that would not be executed if said program code were executed in accordance with said one or more execution conditions;
   removing said unnecessary part of said program code from said program code to provide an optimized program code; and
   transmitting said optimized program code to a user terminal over a communication network;
   wherein said step of obtaining execution data comprises:
      obtaining said execution data from said user terminal after said user terminal has partially executed said program code, said execution data being data for allowing said user terminal to resume execution of said program code from a position at which said user terminal ended execution of said program code.

3. A method in a distribution server, said method comprising:
   obtaining a program code;
   obtaining execution data indicative of one or more execution conditions related to said program code;
   determining an unnecessary part of said program code that would not be executed if said program code were executed in accordance with said one or more execution conditions;
   removing said unnecessary part of said program code from said program code to provide an optimized program code; and
   transmitting said optimized program code to a user terminal over a communication network;
   wherein said execution data includes a value of a program counter, values in a heap, and values on a stack that result from said user terminal partially executing said program code.

4. The method of claim 3, wherein said step of transmitting comprises:
   compressing said optimized program code to provide compressed optimized program code; and
   transmitting said compressed optimized program code to said user terminal over said communication network.

5. A method in a distribution server, said method comprising:
   obtaining a program code;
   obtaining execution data indicative of one or more execution conditions related to said program code;
   determining an unnecessary part of said program code that would not be executed if said program code were executed in accordance with said one or more execution conditions;
   removing said unnecessary part of said program code from said program code to provide an optimized program code; and
   transmitting said optimized program code to a user terminal over a communication network;
   wherein the method further comprises:
      obtaining user data including data output as a result of partial execution of said program code by said user terminal; and
   wherein said step of transmitting comprises:
      transmitting, as a group, said optimized program code, said execution data, and said user data to said user terminal over said communication network.

6. A method in a distribution server, said method comprising:
   obtaining a program code;
   obtaining execution data indicative of one or more execution conditions related to said program code;
   determining an unnecessary part of said program code that would not be executed if said program code were executed in accordance with said one or more execution conditions;
   removing said unnecessary part of said program code from said program code to provide an optimized program code; and
   transmitting said optimized program code to a user terminal over a communication network;
   wherein said execution data includes information about a value of an instance variable of each object generated in a memory of said user terminal when said program code has been partially executed by said user terminal.

7. The method of claim 5,
   wherein said step of obtaining execution data, comprises:

obtaining said execution data indicative of said one or more execution conditions related to said program code; and obtaining user terminal information including information about at least one of hardware resources and software resources of said user terminal;

wherein said step of determining comprises:

determining said unnecessary part of said program code that would not be executed if said program code were executed in accordance with said one or more execution conditions; and determining, based on said user terminal information, an additional unnecessary part of said program code that would not be executed if said program code were executed by said user terminal; and wherein said step of removing comprises:

removing said unnecessary part of said program code and said additional unnecessary part of said program code from said program code to provide said optimized program code.

8. The method of claim 7, wherein said user terminal information comprises at least one of a size of a screen of the user terminal, a size of a useable volatile memory of the user terminal, and a size of a useable non-volatile storage region of the user terminal.

9. A method in a distribution server, said method comprising:

obtaining a program code;

obtaining execution data indicative of one or more execution conditions related to said program code;

determining an unnecessary part of said program code that would not be executed if said program code were executed in accordance with said one or more execution conditions;

removing said unnecessary part of said program code from said program code to provide an optimized program code; and transmitting said optimized program code to a user terminal over a communication network;

wherein said step of obtaining execution data, comprises:

obtaining said execution data indicative of said one or more execution conditions related to said program code; and obtaining user terminal information comprising a name of a class library cached in said user terminal;

wherein said step of determining comprises:

determining said unnecessary part of said program code that would not be executed if said program code were executed in accordance with said one or more execution conditions; and determining, based on said user terminal information, an additional unnecessary part of said program code that is a part of said program code that corresponds to said class library; and wherein said step of removing comprises:

removing said unnecessary part of said program code and said additional unnecessary part of said program code from said program code to provide said optimized program code.

10. The method of claim 3, further comprising:

caching said optimized program code in said distribution server;

receiving a request over said communication network from a second user terminal for a second optimized program code;

determining whether said cached optimized program code is useable as said second optimized program code; and transmitting said cached optimized program code to said second user terminal over said communication network if it is determined that said cached optimized program code is useable as said second optimized program code.

11. A system, comprising:

a distribution server for distributing an optimized program code and execution data to a user terminal over a communication network, said distribution server comprising:

a code optimization unit for optimizing a program code based on said execution data, said execution data being indicative of one or more execution conditions related to said program code, said code optimization unit configured to determine an unnecessary part of said program code that would not be executed if said program code were executed in accordance with said one or more execution conditions, said code optimization unit further configured to remove said unnecessary part of said program code from said program code to provide said optimized program code; and the user terminal for receiving said optimized program code and said execution data from said distribution server over said communication network, and for executing said optimized program code while applying said one or more execution conditions.

12. The system of claim 11, wherein said execution data includes a value of a program counter; and wherein said user terminal is configured to execute said optimized program code starting at an address specified by said value of said program counter in said execution data.

13. The system of claim 11, wherein said execution data includes values in a heap and values on a stack that result from partial execution of said program code; and wherein said user terminal is configured to execute said optimized program code using said values in said heap and values on said stack specified in said execution data.

14. The system of claim 11, wherein said code optimization unit is further configured to compress said optimized program code to provide a compressed optimized program code; and wherein said distribution server is configured to transmit said compressed optimized program code to said user terminal.

15. The system of claim 11, wherein said code optimization unit is configured to optimize said program code based on said execution data and based on user terminal information to provide said optimized program code, said user terminal information including information about at least one of hardware resources and software resources of said user terminal.

16. The system of claim 15, wherein said user terminal information comprises at least one of a size of a screen of the user terminal, a size of a useable volatile memory of the user terminal, and a size of a useable non-volatile storage region of the user terminal.

17. The system of claim 15, wherein said user terminal information comprises a name of a class library cached in said user terminal; and wherein said code optimization unit is configured to determine an additional unnecessary part of said program code that is a part of said program code that corresponds to said class library; and wherein said code optimization unit is configured to remove said unnecessary part of said program code and said additional unnecessary part of said program code from said program code to provide said optimized program code.

18. The system of claim 11, further comprising:

a second user terminal for requesting a second optimized program code from said distribution server;

wherein said distribution server is configured to cache said optimized program code;

wherein said distribution server is configured to determine whether said cached optimized program code is useable as said second optimized program code when said distribution server receives said request for said second optimized program code from said second user terminal; and wherein said distribution server is configured to transmit said cached optimized program code to said second user terminal over said communication network if it is determined that said cached optimized program code is useable as said second optimized program code.

19. A distribution server for distributing an optimized program code to a user terminal over a communication network, comprising:

a code optimization unit for optimizing a program code based on execution data, said execution data being indicative of one or more execution conditions related to said program code, said code optimization unit comprising:

a code extraction unit for determining an unnecessary part of said program code that would not be executed if said program code were executed in accordance with said one or more execution conditions, and for removing said unnecessary part of said program code from said program code to provide said optimized program code;

wherein said distribution server is configured to transmit, as a group, said optimized program code and said execution data to said user terminal over said communication network.

20. A distribution server for distributing an optimized program code to a user terminal over a communication network, comprising:

a code optimization unit for optimizing a program code based on execution data, said execution data being indicative of one or more execution conditions related to said program code, said code optimization unit comprising:

a code extraction unit for determining an unnecessary part of said program code that would not be executed if said program code were executed in accordance with said one or more execution conditions, and for removing said unnecessary part of said program code from said program code to provide said optimized program code;

wherein said execution data includes information about a value of a program counter, values in a heap, and values in a stack that result from said user terminal partially executing said program code.

21. A distribution server for distributing an optimized program code to a user terminal over a communication network, comprising:

a code optimization unit for optimizing a program code based on execution data, said execution data being indicative of one or more execution conditions related to said program code, said code optimization unit comprising:

a code extraction unit for determining an unnecessary part of said program code that would not be executed if said program code were executed in accordance with said one or more execution conditions, and for removing said unnecessary part of said program code from said program code to provide said optimized program code;

wherein said code extraction unit is configured to determine, based on user terminal information, an additional unnecessary part of said program code, said user terminal information including information about at least one of hardware resources and software resources of said user terminal;

wherein said code extraction unit is configured to remove said unnecessary part of said program code and said additional unnecessary part of said program code from said program code to provide said optimized program code;

wherein said user terminal information comprises a name of a class library cached in said user terminal; and wherein said code extraction unit is configured to determine, based on said user terminal information, said additional unnecessary part of said program code as a part of said program code that corresponds to said class library.

22. The distribution server of claim 20, further comprising:

a cache unit for caching said optimized program code;

wherein said distribution server is configured to receive, over said communication network, a request from a second user terminal for second optimized program code;

wherein said distribution server is configured to determine whether said cached optimized program code is useable as said second optimized program code; and wherein said distribution server is configured to transmit said cached optimized program code to said second user terminal over said communication network if it is determined that said cached optimized program code is useable as said second optimized program code.

23. A user terminal, comprising:

an application management unit for obtaining execution data indicative of one or more execution conditions related to a program code after said program code has been partially executed by said user terminal, and for transmitting said execution data to a distribution server over a communication network; and an execution data processing unit for obtaining an optimized program code and said execution data from said distribution server over said communication network, and for executing said optimized program code while applying said one or more execution conditions, said optimized program code being an optimized version of said program code that results from optimization of said program code by said distribution server based on said execution data.

24. A storage medium storing a program for causing a distribution server to execute a process, said process comprising:

obtaining a program code;

obtaining execution data indicative of one or more execution conditions related to said program code;

determining an unnecessary part of said program code that would not be executed if said program code were executed in accordance with said one or more execution conditions;

removing said unnecessary part of said program code from said program code to provide an optimized program code; and transmitting said optimized program code to a user terminal over a communication network;

wherein said step of obtaining execution data comprises:
obtaining said execution data from said user terminal after said user terminal has partially executed said program code, said execution data being data for allowing said user terminal to resume execution of said program code from a position at which said user terminal ended execution of said program code.

25. A storage medium storing a program for causing a distribution server to execute a process, said process comprising:

obtaining a program code;

obtaining execution data indicative of one or more execution conditions related to said program code;

determining an unnecessary part of said program code that would not be executed if said program code were executed in accordance with said one or more execution conditions;

removing said unnecessary part of said program code from said program code to provide an optimized program code; and transmitting said optimized program code to a user terminal over a communication network;

wherein said execution data includes a value of a program counter, values in a heap, and values on a stack that result from said user terminal partially executing said program code.

26. The storage medium of claim 25, wherein said step of transmitting comprises:

compressing said optimized program code to provide compressed optimized program code; and transmitting said compressed optimized program code to said user terminal over said communication network.

27. A user terminal, comprising:

an execution data processing unit for obtaining an optimized program code and execution data from a distribution server over a communication network, and for executing said optimized program code while applying one or more execution conditions that are specified in said execution data, said optimized program code being an optimized version of a program code that results from said distribution server removing an unnecessary part of said program code from said program code that would not be executed if said program code were executed in accordance with said one or more execution conditions.

* * * * *